United States Patent
Chen et al.

(10) Patent No.: US 10,230,311 B2
(45) Date of Patent: Mar. 12, 2019

(54) METHOD AND APPARATUS OF DEAD TIME TUNING IN AN INVERTER

(71) Applicant: Hong Kong Applied Science and Technology Research Institute Co. Ltd., Hong Kong (CN)

(72) Inventors: Ziang Chen, Hong Kong (CN); Jun Chen, Hong Kong (CN); Hang Sang Lee, Hong Kong (CN)

(73) Assignee: Hong Kong Applied Science and Technology Research Institute Co. Ltd., Hong Kong (CN)

( * ) Notice: Subject to any disclaimer, the term of this patent is extended or adjusted under 35 U.S.C. 154(b) by 0 days.

(21) Appl. No.: 15/459,003

(22) Filed: Mar. 15, 2017

(65) Prior Publication Data
US 2018/0269806 A1    Sep. 20, 2018

(51) Int. Cl.
*H02M 7/537* (2006.01)
*H02M 1/32* (2007.01)
*G01K 7/22* (2006.01)

(52) U.S. Cl.
CPC ............. *H02M 7/537* (2013.01); *G01K 7/22* (2013.01); *H02M 1/32* (2013.01); *H02M 2001/327* (2013.01)

(58) Field of Classification Search
CPC .. H02M 7/537; H02M 1/32; H02M 2001/237; G01K 7/22
See application file for complete search history.

(56) References Cited

U.S. PATENT DOCUMENTS

| 6,294,954 | B1  | 9/2001  | Melanson |
|-----------|-----|---------|----------|
| 7,400,163 | B2* | 7/2008  | Yanagigawa ........... H02M 1/38 323/282 |
| 7,456,620 | B2* | 11/2008 | Maksimovic ........... H02M 1/38 323/246 |
| 8,385,092 | B1  | 2/2013  | Shekhawat |
| 2016/0277012 | A1 | 9/2016 | Abesingha et al. |

(Continued)

FOREIGN PATENT DOCUMENTS

| CN | 101345474 A | 1/2009 |
| CN | 201846233 U | 5/2011 |
| CN | 103516246 A | 1/2014 |

(Continued)

OTHER PUBLICATIONS

Armbruster Cornelius, et al., "Application of GaN power transistors in a 2.5 MHz LLC DC/DC converter for compact and efficient power conversion", 2016 18th European Conference on Power Electronics and Applications (EPE'16 ECCE Europe), Sep. 5-9, 2016, pp. 1-7, Karlsruhe, Germany.

*Primary Examiner* — Jue Zhang
*Assistant Examiner* — Lakaisha Jackson
(74) *Attorney, Agent, or Firm* — Eagle IP Limited; Jacqueline C. Lui

(57) ABSTRACT

A method prevents shoot-through currents and reduces body-diode conduction time in an inverter circuit by changing dead times for transistors in the inverter circuit. A sensing resistor senses temperatures of transistors in the inverter circuit. A delay generator changes delay times in response to receiving the temperatures of the transistors from the sensing resistor. A dead time generation unit changes the dead times for the transistors in response to changes in the delay times.

20 Claims, 18 Drawing Sheets

(56) References Cited

U.S. PATENT DOCUMENTS

2018/0131282 A1* 5/2018 Chen .................. H03K 5/1515

FOREIGN PATENT DOCUMENTS

| CN | 104283443 A | 1/2015 |
| CN | 105191094 A | 12/2015 |
| JP | H1127951 A | 1/1999 |
| JP | 2003033048 A | 1/2003 |
| JP | 3594528 B2 * | 12/2004 |

* cited by examiner

METHOD AND APPARATUS OF DEAD TIME TUNING IN AN INVERTER

FIELD OF THE INVENTION

The present invention relates to methods and apparatus that prevent shoot-through current and reduce body-diode conduction time of power devices in an inverter circuit by changing dead times.

BACKGROUND

Power inverters are electronic devices or circuits that change direct current (DC) into alternating current (AC). Inverters play an important role in modern electronics and have wide applications that include uninterruptible power supplies, solar power, induction heating, wireless power transfer, and many other technologies. Unfortunately, some inverters are subject to shoot-through current which can cause a myriad of problems.

New methods and systems that prevent shoot-through current and reduce body-diode conduction time in inverters will assist in advancing technological needs and solving technological problems.

SUMMARY OF THE INVENTION

Figure 1:
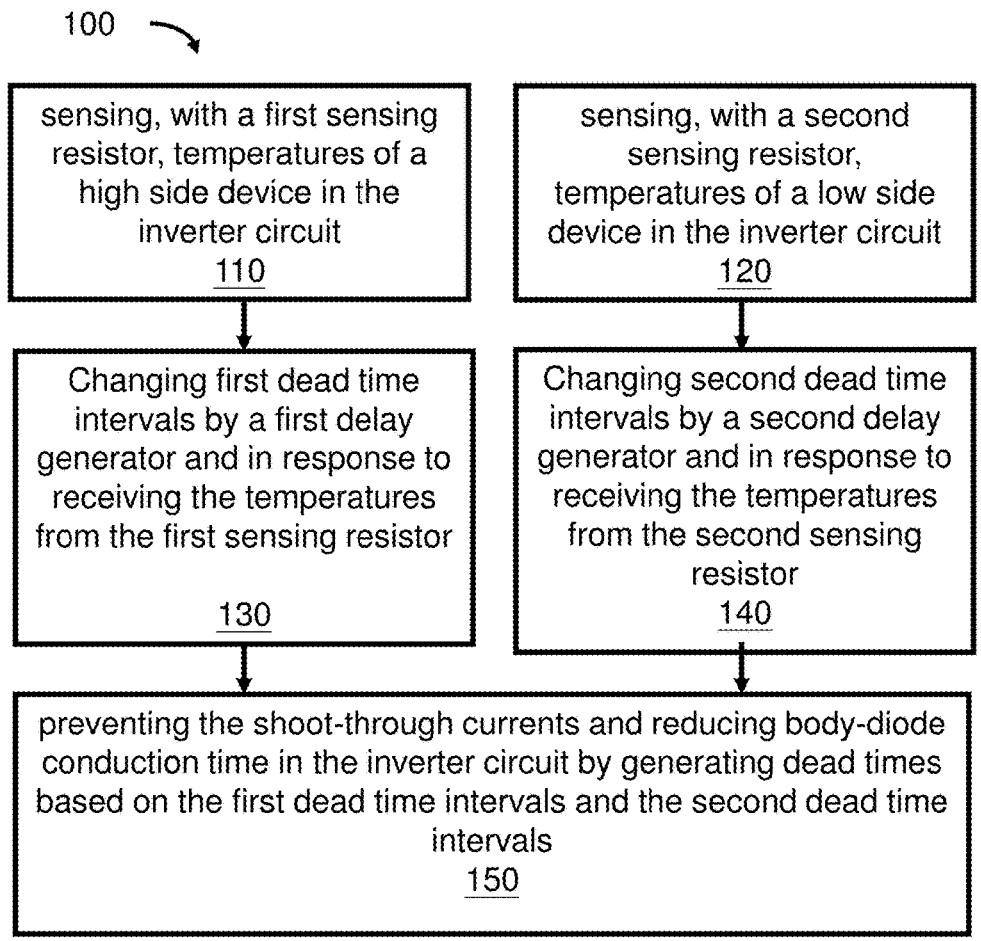
FIG. 1 shows a method that prevents shoot-through currents and reduces body-diode conduction time in an inverter circuit in accordance with an example embodiment.

One example embodiment is an inverter circuit that prevents shoot-through currents and reduces body-diode conduction time in the inverter circuit. The inverter circuit includes a first sensing resistor and a second sensing resistor that are thermally connected to a high side device and a low side device in the inverter circuit respectively. A dead times generation unit that prevents shoot-through and reduces body-diode conduction time currents by generating dead times including first dead time intervals and second dead time intervals for the high side and low side device. The dead time generation unit includes a first delay generator and a second delay generator. The first delay generator changes the first dead time intervals and the second delay generator changes the second dead time intervals. The first sensing resistor is connected between an input and an output of the first delay generator, and a first capacitor is connected between the output of the first delay generator and a ground. Similarly, the second sensing resistor is connected between an input and an output of the second delay generator, and a second capacitor is connected between the output of the second delay generator and the ground.

Other example embodiments are discussed herein.

DETAILED DESCRIPTION

Example embodiments relate to apparatus and methods that prevent shoot-through currents and reduce body-diode conduction time in an inverter circuit.

Power inverters (or inverters) are electronic devices or circuits that convert direct current (DC) to alternating current (AC). Inverters are widely used in different applications, e.g. induction heating, power amplifiers, uninterruptible power supplies, and many other applications. One type of an inverter, known as a Class-D inverter, is used in wireless power transfer systems because the inverter has higher efficiency, is more robust to load variation, and provides higher output power.

With a Class-D inverter and other inverters, it is important to avoid a situation that occurs when high side devices and low side devices in the inverter circuit are on simultaneously. This situation creates a low-resistance path and generates large shoot-through currents. For example, shoot-through current occurs when two power devices are both either fully or partially on which provides a path for a large surge of current to shoot through from $V_{IN}$ to GND. In consequence, the devices in the inverter circuit heat up and waste power or even become damaged.

One way to mitigate or eliminate shoot-through current is with a dead time generator or dead times generation unit. This generator creates time delays between the inputs of devices to avoid shoot-through currents. The time intervals in which both devices are off are called dead times.

When the inverter is in desired operation, the inputs of devices should not be high on the same time. For example, when an input A for driving the high side device (e.g., transistor 1) is on, an input B for driving the low side device (e.g., transistor 2) is off, and vice versa. Nonetheless, when the input A and the input B are in a switching stage, the devices may run into undesired operation. Thus, there is a short period of time where both devices are in the "on" stage and a short circuit occurs. During dead times, both the input A and the input B are at the "off" stage.

When the dead time $T_D$ is equal to a predetermined critical time $T_{crit}$, there is no power loss in the circuit. When $T_D$ is less than zero, shoot-through currents occur. When $T_D$ is greater than or equal to zero and less than $T_{crit}$, there is some switching loss in the circuit. When $T_D$ is greater than $T_{crit}$, negative current causes body-diode conduction.

Example embodiments solve the above-stated problems by providing technical solutions in dead times generation with new methods and apparatus that prevent shoot-through currents and reduce body-diode conduction time in an inverter circuit. In particular, generation of dead times in example embodiment is not restricted to generating one fixed dead time which is only suitable for one loading condition.

Example embodiments include methods and apparatus that change the length of dead times to avoid device breakdown, inefficiency in power conversion, overheat of device and driver malfunction caused by serious undershoot voltage. Example embodiments also mitigate or eliminate shoot-through currents that occur in inverter circuits, including Class-D inverter circuits.

Example embodiments benefit the operations of inverter circuits and increase the efficiency in the converting DC to AC which is useful in many different electronic devices and applications.

By way of example, the efficiency of power devices with high body-diode forward bias voltage (such as enhancement mode GaN HEMTs) is seriously affected by dead time length. The device temperature is proportional to power loss of these power devices. The optimal dead time value for the inverters achieves the minimal power loss in terms of minimal device temperature detected. Example embodiments provide methods and apparatus that automatically adjust dead times and maintain the inverter circuit at the optimal dead time value.

As a further benefit, example embodiments reduce the importance of implementation of heat sink in an inverter circuit and remove the requirement of expensive cooling components in the inverter circuit.

Example embodiments include a method that senses temperatures of devices in an inverter circuit by sensing resistors and changes dead times for the devices in response to receiving the temperatures from the sensing resistors.

In one example embodiment, an inverter circuit prevents shoot-through currents and reduces body-diode conduction time in the inverter circuit and includes a first sensing resistor and a second sensing resistor.

By way of example, the first sensing resistor is thermally connected to a high side device (e.g., a first transistor) in the inverter circuit.

By way of example, the second sensing resistor is thermally connected to a low side device (e.g., a second transistor) in the inverter circuit.

As an example, the inverter circuit includes a dead times generation unit that prevents shoot-through currents and reduces body-diode conduction time by generating dead times including first dead time intervals and second dead time intervals. The dead times generation unit has outputs that connect to the high side device and the low side device.

By way of example, the dead times generation unit includes a first delay generator and a second delay generator.

By way of example, the first delay generator changes first dead time intervals and the second delay generator changes second dead time intervals.

By way of example, the first sensing resistor is connected between an input and an output of the first delay generator, and a first capacitor is connected between the output of the first delay generator and a ground.

By way of example, the second sensing resistor is connected between an input and an output of the second delay generator, and a second capacitor is connected between the output of the second delay generator and the ground.

FIG. 1 shows a method that prevents shoot-through currents and reduces body-diode conduction time in an inverter circuit in accordance with an example embodiment.

Block 110 illustrates sensing, with a first sensing resistor, temperatures of a high side device in the inverter circuit.

By way of example, the first sensing resistor thermally connects to the high side device through a metal wire or any heat conducting materials.

By way of example, the high side device is enclosed in or thermally connected to a heat sink, and the first sensing resistor is also enclosed in or thermally connected to a heat sink.

Block 120 illustrates sensing, with a second sensing resistor, temperatures of a low side device in the inverter circuit.

By way of example, the second sensing resistor thermally connects to the low side device through a metal wire or a heat conducting material.

By way of example, the low side device is enclosed in or thermally connected to a heat sink, and the second sensing resistor is also enclosed in or thermally connected to a heat sink.

By way of example, the high side device and low side device can be selected from one or more types of transistor, including but not limited to enhancement mode GaN, GaN power transistors, and MOSFETs. There are high power-density devices that result in obvious temperature variations.

By way of example, a source voltage connects to a drain of the high side device. A source of the high side device connects to a drain of the low side device. A source of the low side device connects to the ground.

Block 130 illustrates changing first dead time intervals by a first delay generator and in response to receiving the temperatures from the first sensing resistor.

For example, the resistances of the first sensing resistor change in response to detecting or sensing the temperatures of the high side device. The first delay times generated from the first delay generator automatically change in response to changes in the resistances of the first sensing resistor. These changes occur continually or continuously in real-time as the sensed temperature of the high device changes. The first dead time intervals change in response to changing the first delay times generated by the RC delay. R is the value of sensing resistor. C is the capacitor inside the delay generator.

By way of example, the first sensing resistor is connected between an input and an output of the first delay generator, and a first capacitor is connected between the output of the first delay generator and a ground.

Block 140 illustrates changing second dead time intervals by a second delay generator and in response to receiving the temperatures from the second sensing resistor.

For example, the resistances of the second sensing resistor change in response to detecting or sensing the temperatures of the low side device. The second delay times generated from the second delay generator automatically change in response to changes in the resistances of the second sensing resistor. These changes occur continually or continuously in real-time as the sensed temperature of the low device changes. The second dead time intervals change in response to changing the second delay times.

By way of example, the second sensing resistor is connected between an input and an output of the second delay generator, and a second capacitor is connected between the output of the second delay generator and the ground.

Block 150 illustrates preventing the shoot-through currents and reducing body-diode conduction time in the inverter circuit by generating dead times based on the first dead time intervals and the second dead time intervals.

For example, first dead time intervals correspond to dead times before the high side device is turned on, and second dead time intervals correspond to dead times before the low side device is turned on.

By way of example, a NOR gate is inserted in the inverter circuit. An input of the first delay generator connects to a first input of a NOR gate and a pulse width modulator input node. An output of the first delay generator connects to an input of the second delay generator and the high side device. An output of the second delay generator connects to a second input of the NOR gate. An output of the NOR gate connects to the low side device.

Figure 2:
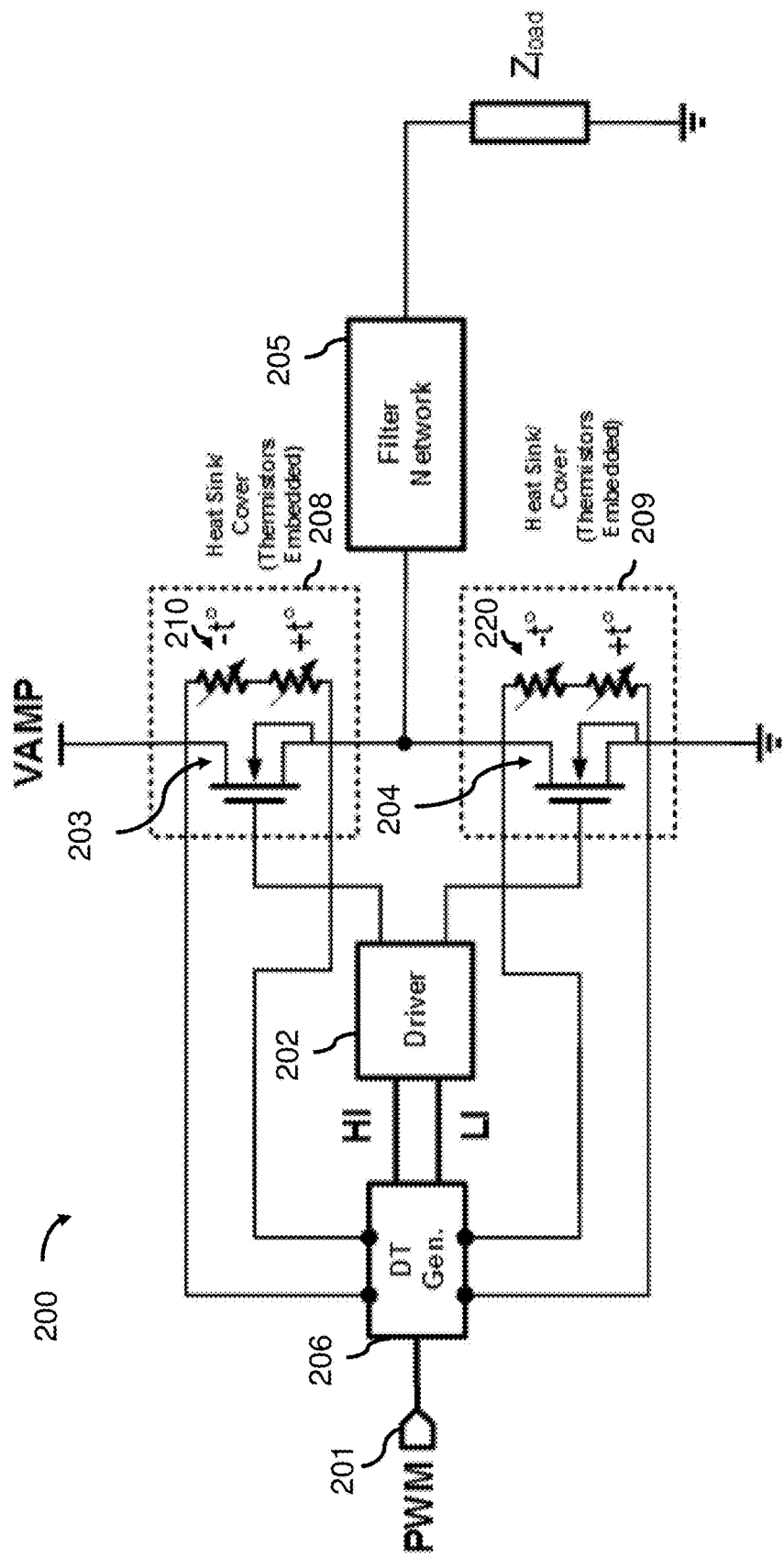
FIG. 2 shows a block diagram of a Class D inverter circuit in a half bridge configuration in accordance with an example embodiment.

FIG. 2 shows a block diagram of a Class D inverter circuit in a half bridge configuration in an example embodiment. One of ordinary skill in the art will appreciate that example embodiments are also applicable with other inverter configurations, such as full bridge configurations.

The circuit 200 includes a pulse width modulator (PWM) input node 201, a dead times generation unit (DT Gen.) 206, a driver 202, a first N channel transistor 203 and a second N channel transistor 204, a first sensing resistor 210 and a second sensing resistor 220. The input of the dead times generation unit 206 connects to the PWM input node 201. The dead times generation unit 206 has a first output HI and a second output LI which connect to the high side device 203 and the low side device 204 via a driver 202. The driver 202 strengthens the first output HI and the second output LI. By way of example, the high side device 203 and the low side device 204 are N channel transistors. Thus, the first output HI of the dead times generation unit 206 connects to a gate of the high side device 203 via the driver 202, and the second output LI of the dead times generation unit 206 connects to a gate of the low side device 204 via the driver 202. A source voltage (VAMP) connects to a drain of the high side device 203 and a source of the high side device connects to a drain of the low side device 204. A source of the low side device 204 connects to the ground. A node, which is between the source of the high side device 203 and the drain of the low side device 204, connects to a filter network 205 and any impedance load (Zload), e.g. resistor, capacitor, inductor etc. By way of example, the high side device 203 is enclosed in a heat sink or a cover 208 and the low side device 204 is enclosed in a heat sink or a cover 209. The first sensing resistor 210 is embedded in the heat sink or the cover 208 and thermally connects to the high side device 203 to sense the temperatures of the high side device 203. The second sensing resistor 220 is embedded in the heat sink or the cover 209 and thermally connects to the low side device 204 to sense the temperatures of the low side device 204. The dead times generation unit 206 connects to the first sensing resistor 210 and the second sensing resistor 220. By way of example, the first sensing resistor 210 includes a negative temperature coefficient (NTC) sensor and positive temperature coefficient (PTC) sensor that are serially connected. The second sensing resistor 220 includes a negative temperature coefficient (NTC) sensor and positive temperature coefficient (PTC) sensor that are serially connected. The negative temperature coefficient (NTC) sensor and positive temperature coefficient (PTC) sensor are thermistors. The dead time generation unit 206, in response to receiving the temperatures from the first sensing resistor 210 and the second sensing resistor 220, changes dead times including first dead time intervals and second dead time intervals. By way of example, the first dead time intervals correspond to dead times before the high side device is turned on and the second dead time intervals correspond to dead times before the low side device is turned on.

Figure 3:
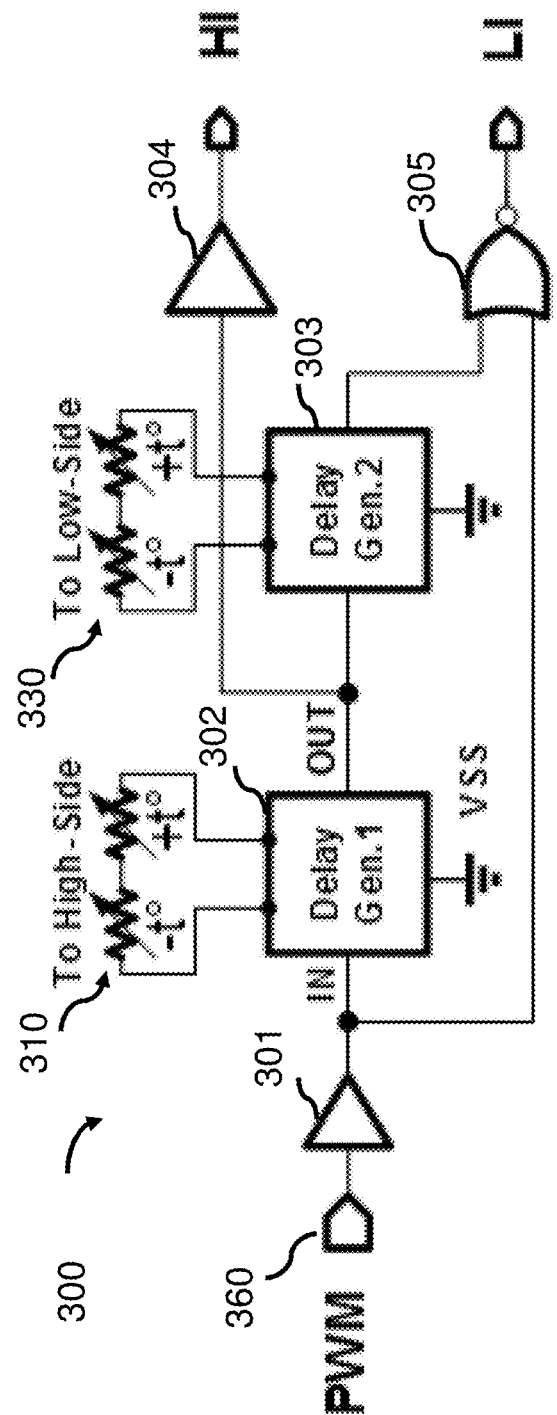
FIG. 3 shows a block diagram of a dead times generation unit in an inverter circuit in half-bridge version in accordance with an example embodiment.

FIG. 3 illustrates a block diagram of a dead times generation unit 300 in an inverter circuit in half-bridge version in an example embodiment. The dead times generation unit include a buffer 301, a first delay generator (Delay Gen. 1) 302, a second delay generator (Delay Gen. 2) 303, a NOR gate 305 and a buffer 304. The input of the dead times generation unit connects to the buffer 301. The output of the buffer 301 connects to an input of the first delay generator 302 and a first input of the NOR gate 305. An output of the first delay generator 302 connects to an input of the second delay generator 303 and a first output HI of the dead times generation unit through the buffer 304. The output of the second delay generator 303 connects to a second input of the NOR gate 305. The output of the NOR gate 305 connects to a second output LI of the dead times generation unit. A first sensing resistor 310 including a NTC sensor and a PTC sensor connects to the first delay generator 302 and thermally connected to a high side device in the inverter circuit. A second sensing resistor 330 including a NTC sensor and a PTC sensor connects to the second delay generator 303 and thermally connected to a low side device in the inverter circuit. The first output HI of the dead times generation unit connects to a gate of the high side device via a driver and the second output LI of the dead times generation unit connects to a gate of the low side device via the driver.

Figure 4:
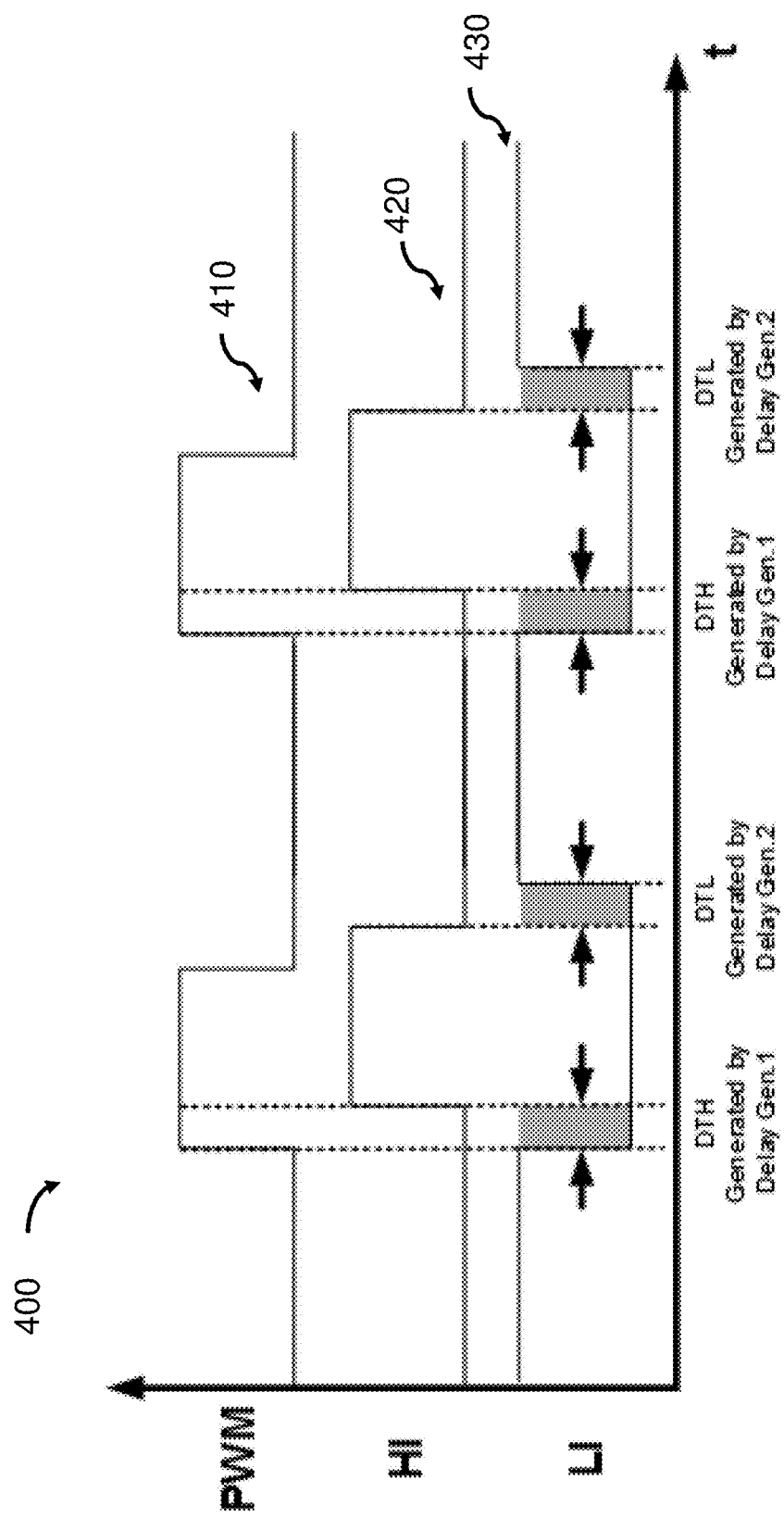
FIG. 4 shows voltage waveforms at the pulse width modulator input node, the first output HI of the dead times generation unit and the second output LI of the dead times generation unit in FIG. 3 in accordance with an example embodiment.

FIG. 4 shows the voltage waveform 410 at the pulse width modulator input node 360 in FIG. 3, the voltage waveform 420 at the first output HI of the dead times generation unit in FIG. 3, the voltage waveform 430 at the second output LI of the dead times generation unit in FIG. 3 in one example embodiment. First dead time intervals DTH are generated by the first delay generator and are corresponding to dead times before the high side device is turned on. Second dead time intervals DTL are generated by the second delay generator and are corresponding to dead times before the low side device is turned on.

Figure 5:
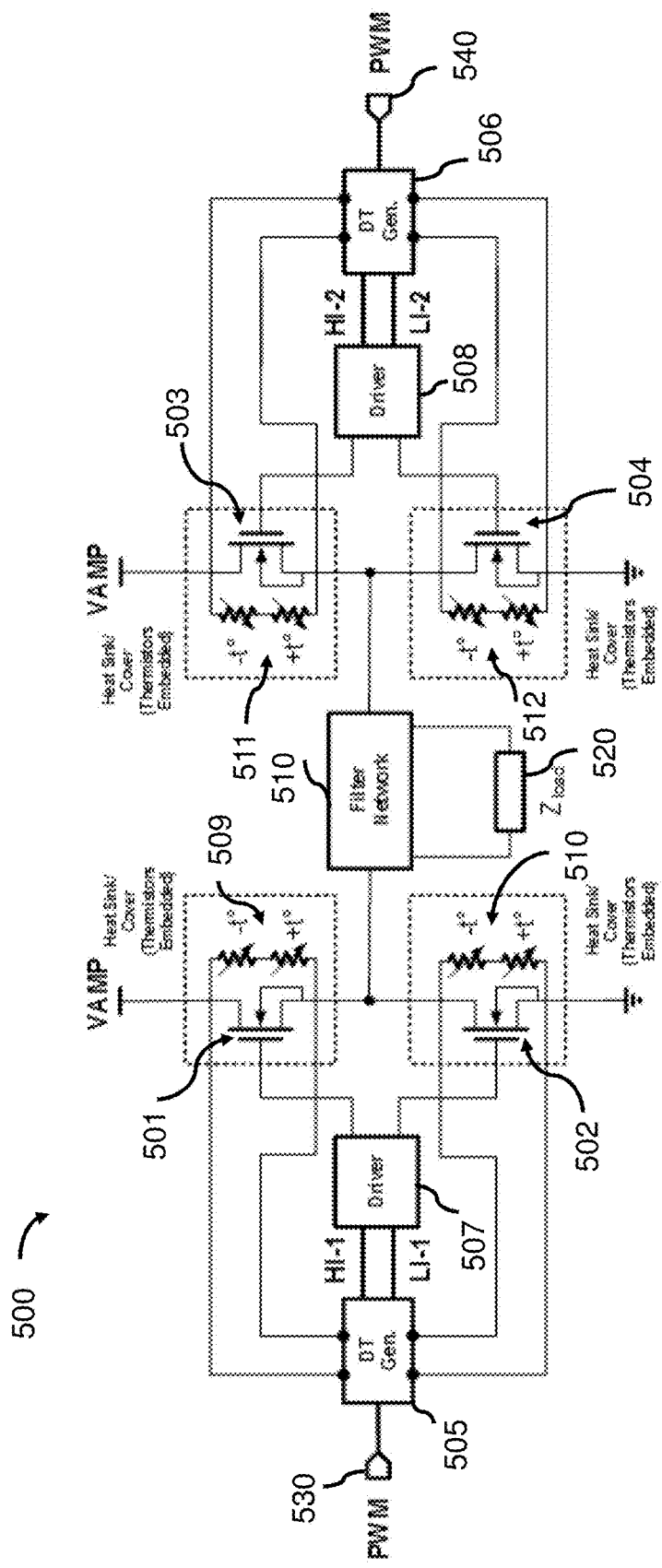
FIG. 5 shows a block diagram of a Class D inverter circuit in a full bridge configuration in accordance with an example embodiment.

FIG. 5 shows a block diagram of a Class D inverter circuit in a full bridge configuration in an example embodiment. The inverter circuit in the full bridge configuration includes two circuits 200 in half bridge version as shown in FIG. 2 connecting to a filter network 510 and an impedance load 520. The inverter circuit includes a first high side device 501, a first low side device 502, a second high side device 503, a second low side device 504, a dead times generation unit including dead time generator 505 and dead time generator 506, a first driver 507, a second driver 508, a first sensing resistor 509, a second sensing resistor 510, a third sensing resistor 511 and a fourth sensing resistor 512. By way of example, the first sensing resistor 509, the second sensing resistor 510, the third sensing resistor 511 and the fourth sensing resistor 512 each include at least one NTC sensor and at least one PTC sensor that are serially connected. The input of the dead time generator 505 connects to a PWM input node 530 and the input of the dead time generator 506 connects to a PWM input node 540. By way of example, the high side device and low side device are selected from a group consisting of enhancement mode GaN, GaN power transistors and silicon MOSFET.

Figure 6:
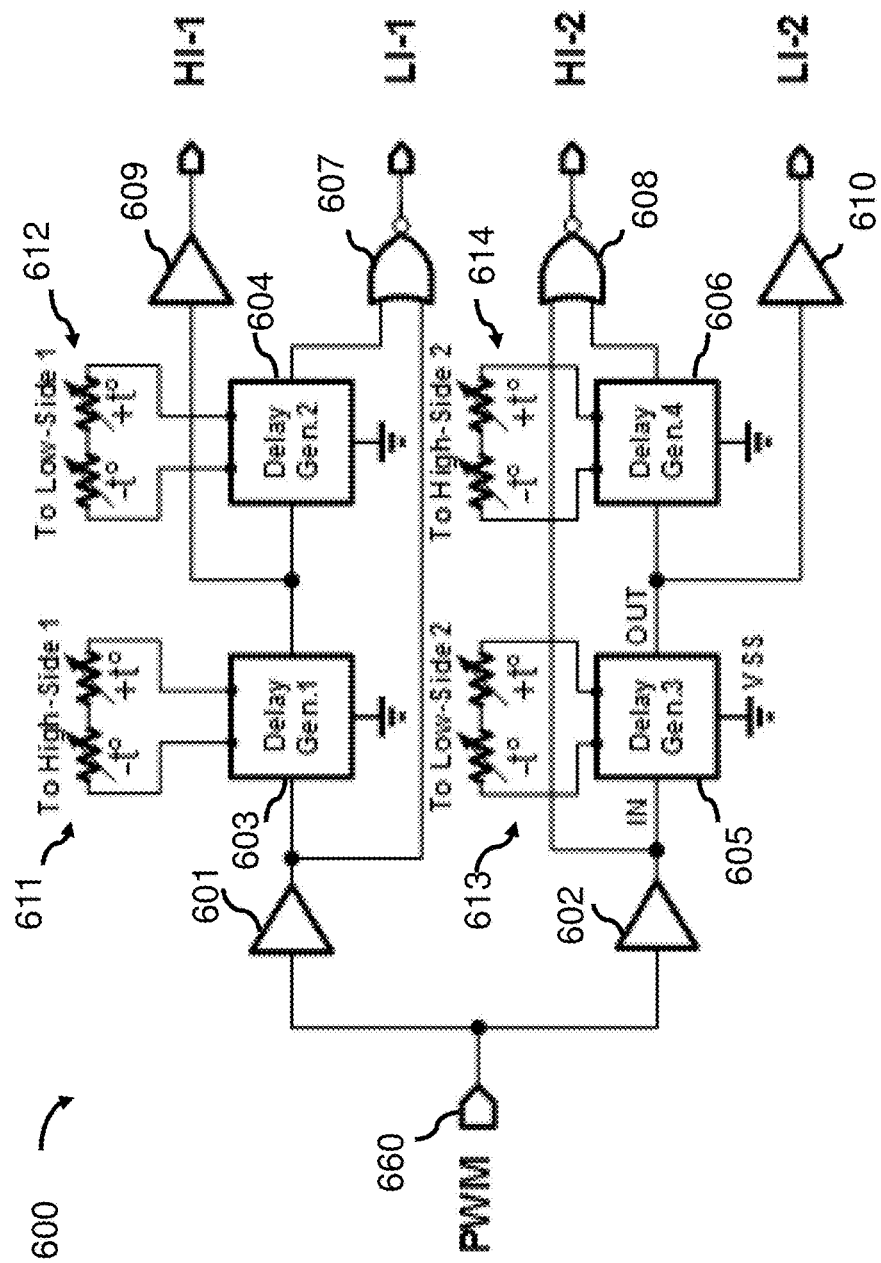
FIG. 6 shows a block diagram of a dead times generation unit for an inverter circuit in full bridge version in accordance with an example embodiment.

FIG. 6 shows a block diagram of a dead times generation unit for an inverter circuit in full bridge version in an example embodiment. The dead times generation unit include a buffer 601 and a buffer 602, a first delay generator (Delay Gen. 1) 603, a second delay generator (Delay Gen. 2) 604, a third delay generator (Delay Gen. 3) 605, a fourth delay generator (Delay Gen. 4) 606, a NOR gate 607, a NOR gate 608, a buffer 609 and a buffer 610. The input of the dead times generation unit connects to the buffer 601 and the buffer 602. The output of the buffer 601 connects to an input of the first delay generator 603 and a first input of the NOR gate 607. An output of the first delay generator 603 connects to an input of the second delay generator 604 and an output HI-1 of the dead times generation unit through the buffer 609. The output of the second delay generator 604 connects to a second input of the NOR gate 607. The output of the NOR gate 607 connects to an output LI-1 of the dead times generation unit. A first sensing resistor 611 including a NTC sensor and a PTC sensor connects to the first delay generator 603 and thermally connected to a first high side device. A second sensing resistor 612 including a NTC sensor and a PTC sensor connects to the second delay generator 604 and thermally connected to a first low side device. The output HI-1 of the dead times generation unit connects to a gate of the first high side device via a first driver and the output LI-1 of the dead times generation unit connects to a gate of the first low side device via the first driver. Similarly, the output of the buffer 602 connects to an input of the third delay generator 605 and a first input of the NOR gate 608. An output of the third delay generator 605 connects to an input of the fourth delay generator 606 and an output LI-2 of the dead times generation unit through the buffer 610. The output of the fourth delay generator 606 connects to a second input of the NOR gate 608. The output of the NOR gate 608 connects to an output HI-2 of the dead times generation unit. A third sensing resistor 613 including a NTC sensor and a PTC sensor connects to the third delay generator 605 and thermally connected to a second low side device. A fourth sensing resistor 614 including a NTC sensor and a PTC sensor connects to the fourth delay generator 606 and thermally connected to a second high side device. The output HI-2 of the dead times generation unit connects to a gate of the second high side device via a second driver and the output LI-2 of the dead times generation unit connects to a gate of the second low side device via the second driver. The HI-2 and LI-2 outputs are opposite to those of HI-1 and LI-1.

Figure 7:
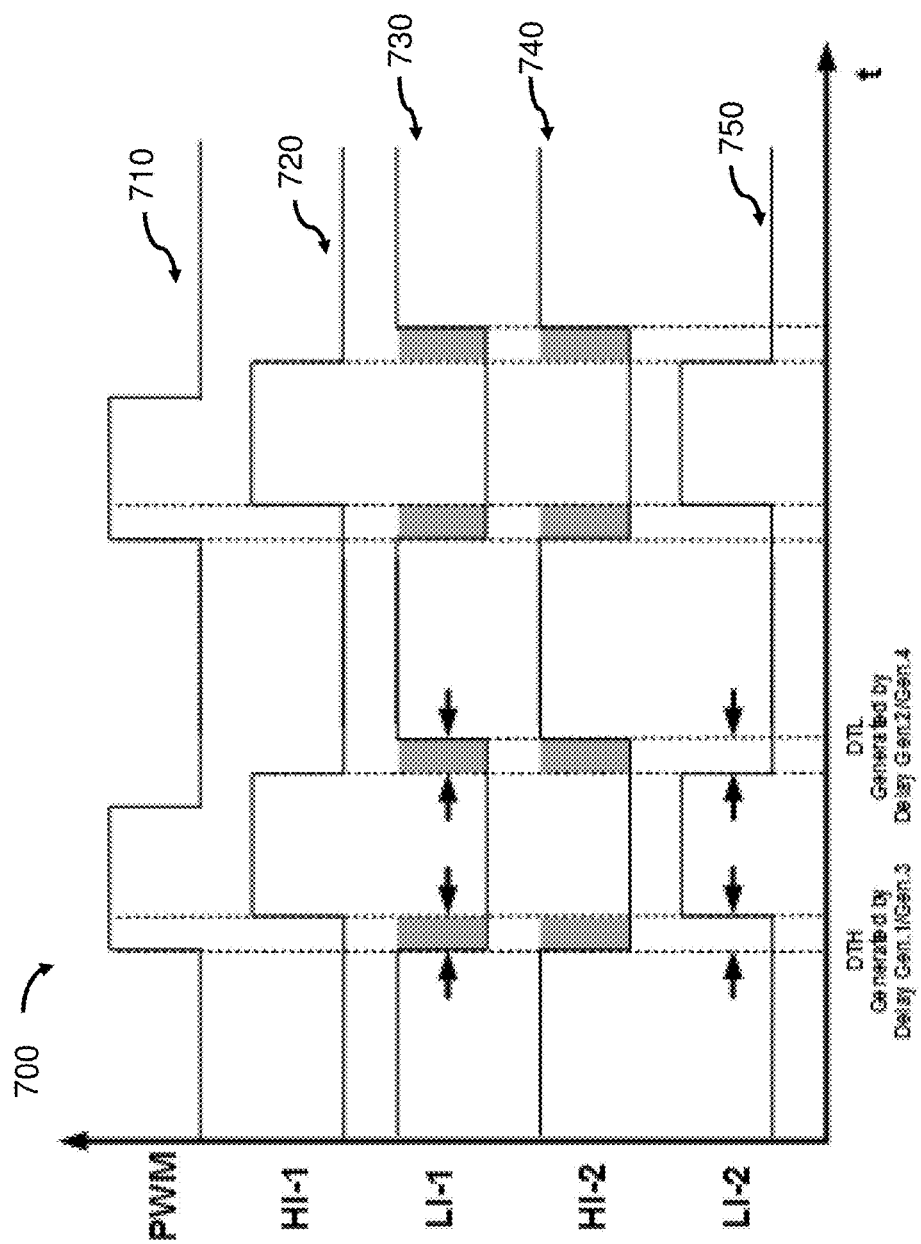
FIG. 7 shows voltage waveforms at the pulse width modulator input node and at the outputs HI-1, LI-1, HI-2, LI-2 of the dead time generation unit in FIG. 6 in accordance with an example embodiment.

FIG. 7 shows the voltage waveform 710 at the pulse width modulator input node 660 in FIG. 6, the voltage waveform 720 at the output HI-1 of the dead time generation unit in FIG. 6, the voltage waveform 730 at the output LI-1 of the dead time generation unit in FIG. 6, the voltage waveform 740 at the output HI-2 of the dead time generation unit in FIG. 6 and the voltage waveform 750 at the output LI-2 of the dead time generation unit in FIG. 6 in one example embodiment. First dead time intervals DTH are generated by the first delay generator and the third delay generator, and are corresponding to dead times before the first high side device and the second low side device are turned on. Second dead time intervals DTL are generated by the second delay generator and the fourth delay generator, and are corresponding to dead times before the first low side device and the second high side device are turned on.

Figure 8:
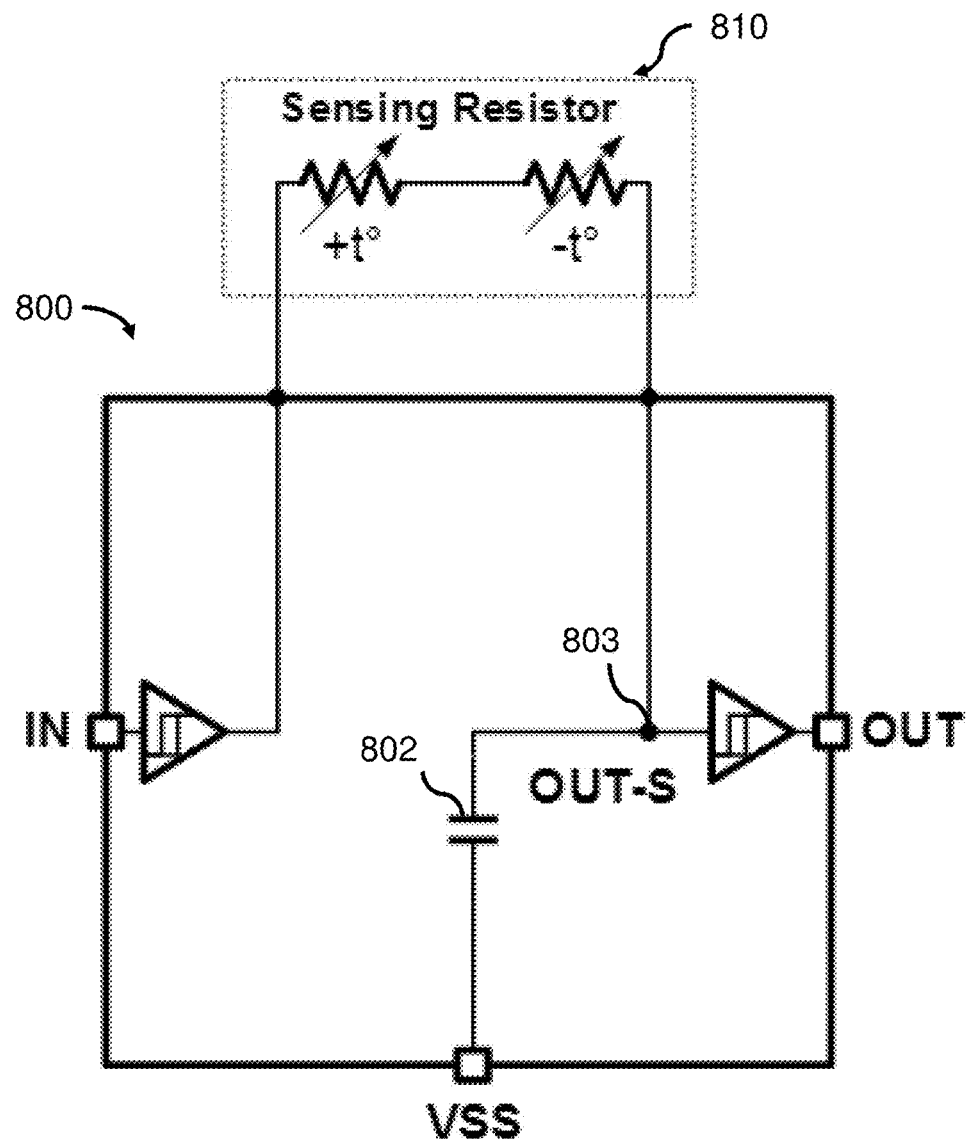
FIG. 8 shows a block diagram for a delay generator in accordance with an example embodiment.

FIG. 8 shows a block diagram for a delay generator 800 in an example embodiment. A sensing resistor 810 including two types of thermistors is connected between an input and an output of the delay generator 800. The thermistors are selected from a group consisting of NTC sensor and PTC sensor. By way of example, at least one NTC sensor and at least one PTC sensor are serially connected. A capacitor 802 is connected between the output of the delay generator and the ground to create a RC delay circuit. The PTC sensor performs overheat protection, such overheat is caused by shoot-through or serious switching loss. And the NTC sensor is used to fine tune the delay time generated from the delay generator.

By way of example, the delay generator 800 in FIG. 8 is used as the first delay generator 302, the second delay generator 303 in FIG. 3 in an example embodiment.

By way of example, the delay generator 800 in FIG. 8 is used as the first delay generator 603, the second delay generator 604, the third delay generator 605 and the fourth delay generator 606 in FIG. 6 in an example embodiment.

Figure 9:
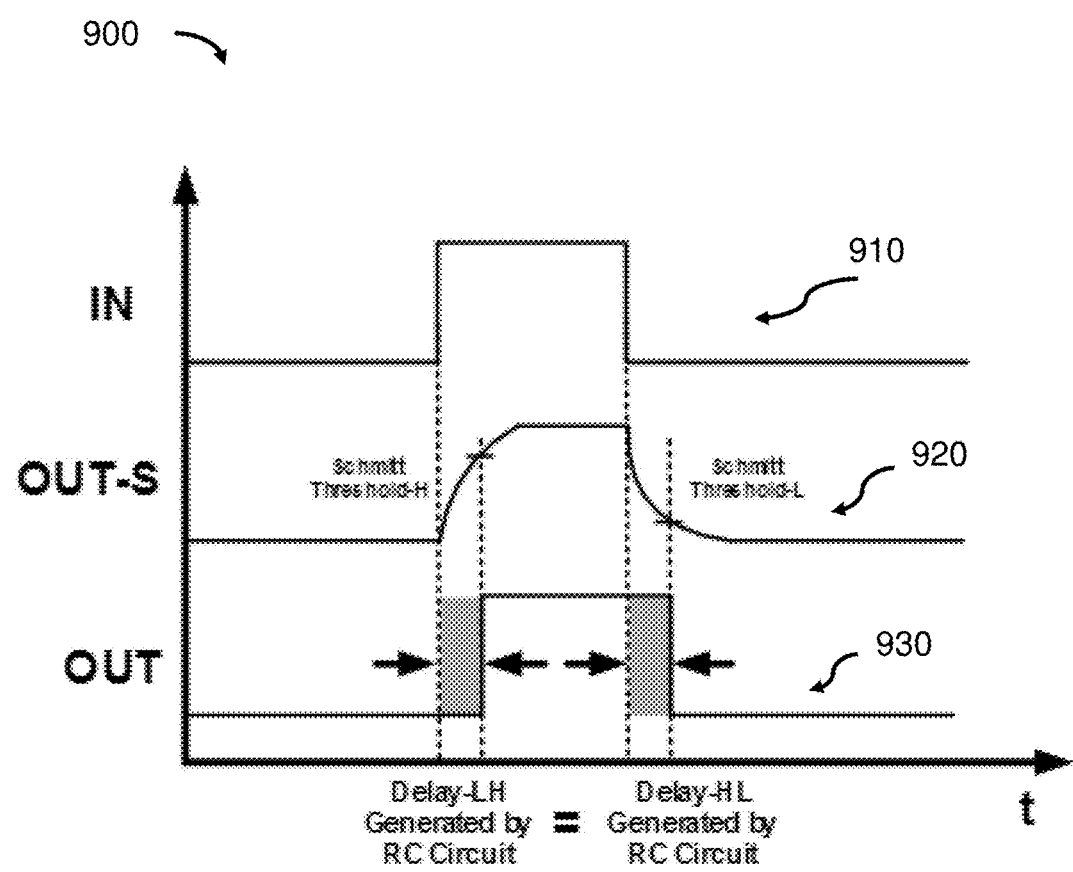
FIG. 9 shows the voltage waveforms at the input, OUT-S node and the output of the delay generator in FIG. 8 in accordance with an example embodiment.

FIG. 9 shows the voltage waveform 910 at the input of the delay generator in FIG. 8, the voltage waveform 920 at the OUT-S node 803 of the delay generator in FIG. 8 and the voltage waveform 930 at the output of the delay generator in FIG. 8 in an example embodiment. The RC circuit in FIG. 8 creates a delay time (Delay-LH) for the rising edge of the input signal and creates a delay time (Delay-HL) for the falling edge of the input signal. Delay-LH has the same time interval as Delay-HL. In the circuit design, these two delay times are kept the same to eliminate voltage waveforms at the node OUT distortion and keep duty-ratio unchanged.

Figure 10:
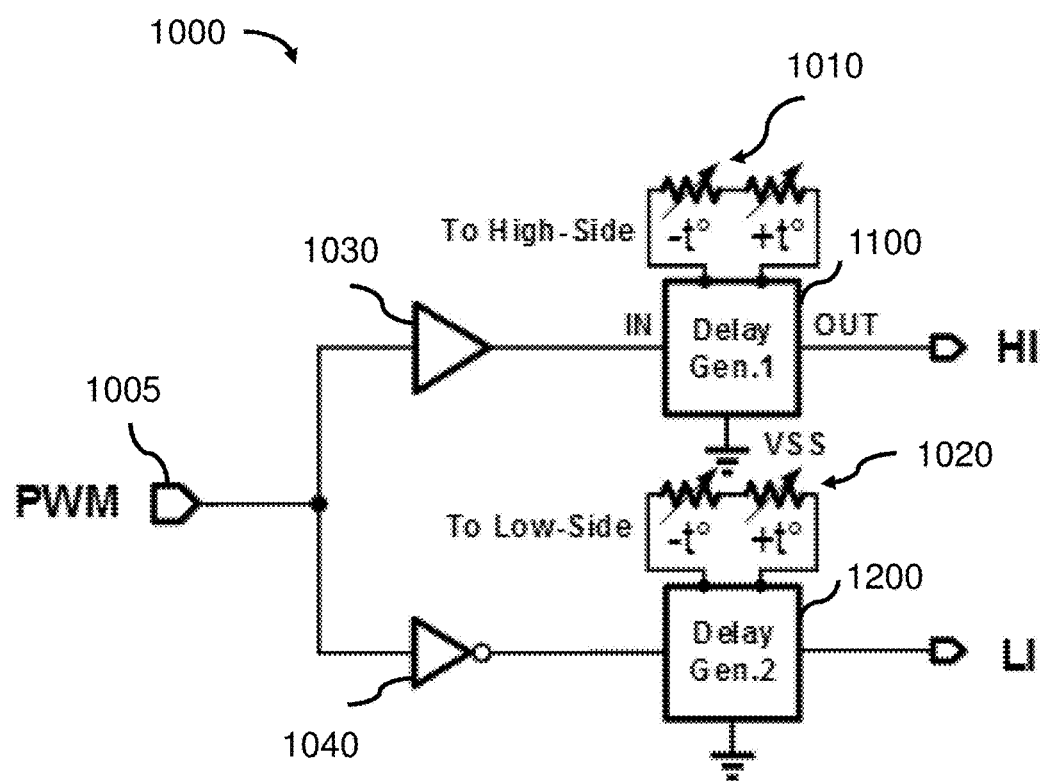
FIG. 10 shows a block diagram of a dead times generation unit in an inverter circuit in half bridge configuration in accordance with an example embodiment.

FIG. 10 shows a block diagram of a dead times generation unit in an inverter circuit in half bridge configuration in another example embodiment. The dead times generation unit include a buffer 1030, a NOT gate 1040, a first delay generator (Delay Gen. 1) 1100 and a second delay generator (Delay Gen. 2) 1200. The input of the dead times generation unit connects to an input of the buffer 1030 and an input of the NOT gate 1040. The output of the buffer 1030 connects to an input of the first delay generator 1100. The output of the NOT gate 1040 connects to an input of the second delay generator 1200. An output of the first delay generator 1100 connects to a first output HI of the dead times generation unit. The output of the second delay generator 1200 connects to a second output LI of the dead times generation unit. A first sensing resistor 1010 including a NTC sensor and a PTC sensor connects to the first delay generator 1100 and thermally connected to a high side device in the inverter circuit. A second sensing resistor 1020 including a NTC sensor and a PTC sensor connects to the second delay generator 1200 and thermally connected to a low side device in the inverter circuit. The first output HI of the dead times generation unit connects to a gate of the high side device via a driver and the second output LI of the dead times generation unit connects to a gate of the low side device via the driver. The resistances of the first sensing resistor change in response to receiving the temperatures of the high side device while the resistances of the second sensing resistor change in response to receiving the temperatures of the low side device. The first delay generator 1100 generates first delay times in response to changing the resistances of the first sensing resistor while the second delay generator 1200 generates second delay times in response to changing the resistances of the second sensing resistor. First dead time intervals change in response to changing the first delay times and second dead time intervals change in response to changing the second delay times.

Figure 11:
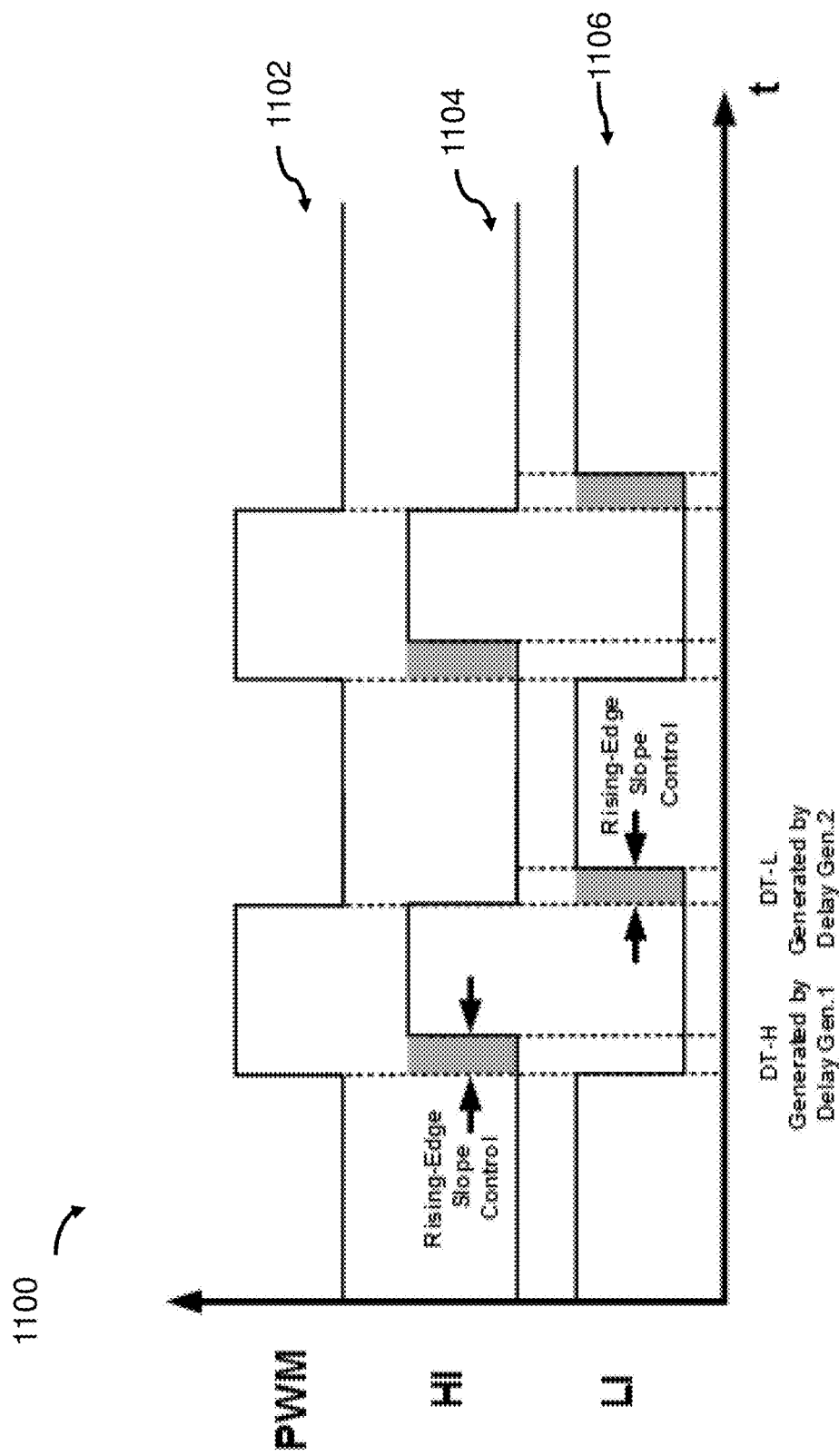
FIG. 11 shows the voltage waveforms at the pulse width modulator input node, the first output HI of the dead times generation unit and at the second output LI of the dead times generation unit in FIG. 10 in accordance with an example embodiment.

FIG. 11 shows the voltage waveform 1102 at the pulse width modulator input node 1005 in FIG. 10, the voltage waveform 1104 at the first output HI of the dead times generation unit in FIG. 10 and the voltage waveform 1106 at the second output LI of the dead times generation unit in FIG. 10 in one example embodiment. The first dead time intervals DT-H are generated by the first delay generator and are corresponding to dead times before the high side device is turned on. The second dead time intervals DT-L are generated by the second delay generator and are corresponding to dead times before the low side device is turned on.

Figure 12:
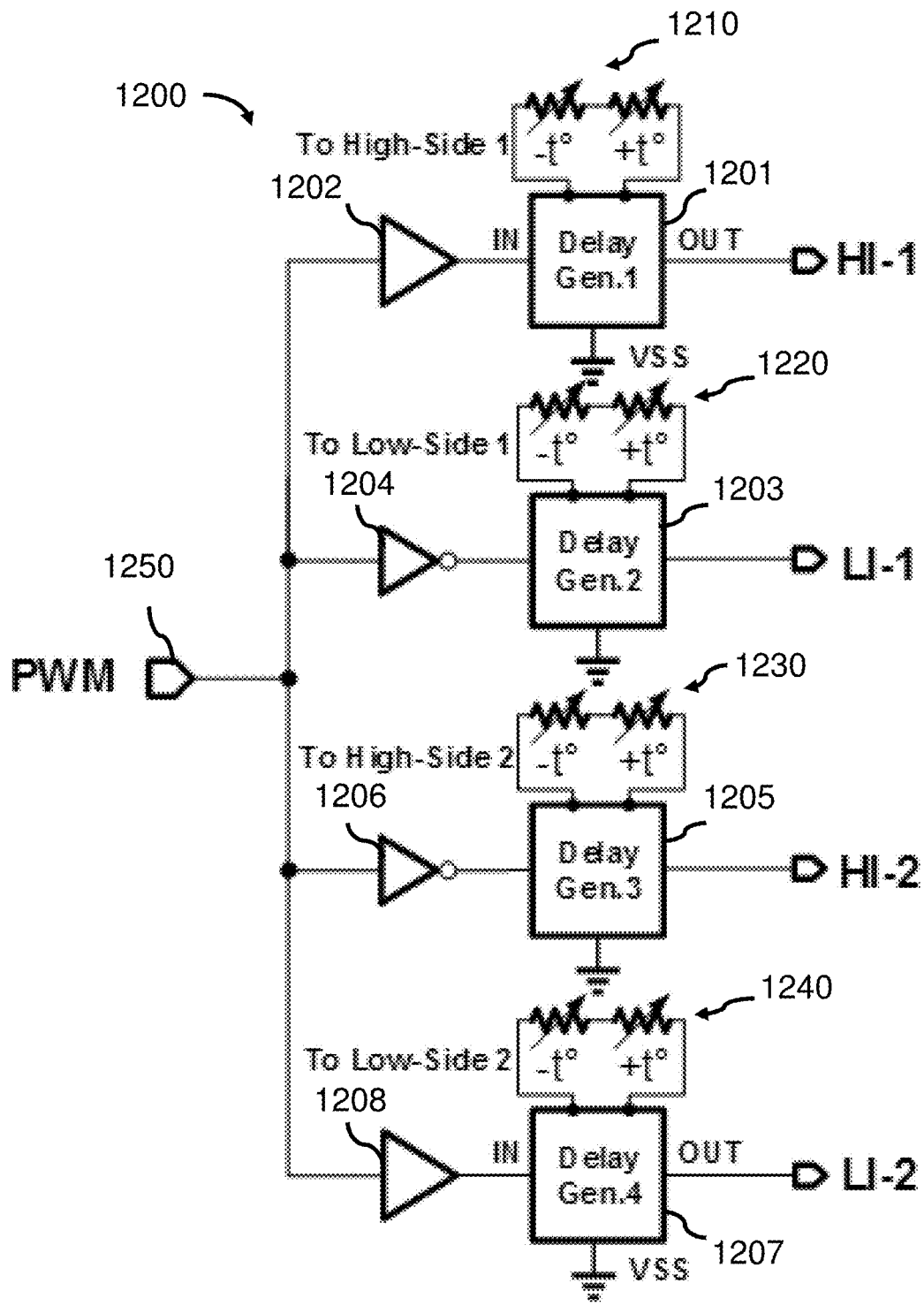
FIG. 12 shows a block diagram of a dead times generation unit for an inverter circuit in full bridge configuration in accordance with an example embodiment.

FIG. 12 shows a block diagram of a dead times generation unit 1200 for an inverter circuit in full bridge configuration in an example embodiment. The dead times generation unit 1200 include a buffer 1202, a NOT gate 1204, a NOT gate 1206, a buffer 1208, a first delay generator (Delay Gen. 1) 1201, a second delay generator (Delay Gen. 2) 1203, a third delay generator (Delay Gen. 3) 1205, a fourth delay generator (Delay Gen. 4) 1207. The input of the dead times generation unit connects to the buffer 1202, the NOT gate 1204, the NOT gate 1206 and the buffer 1208. The output of the buffer 1202 connects to an input of the first delay generator 1201. An output of the first delay generator 1201 connects to an output HI-1 of the dead times generation unit 1200. An output of the NOT gate 1204 connects to an input of the second delay generator 1203. An output of the second delay generator 1203 connects to an output LI-1 of the dead times generation unit 1200. An output of the buffer 1206 connects to an input of the third delay generator 1205. An output of the third delay generator 1205 connects to an output HI-2 of the dead times generation unit 1200. An output of the buffer 1208 connects to an input of the fourth delay generator 1207. An output of the fourth delay generator 1207 connects to an output LI-2 of the dead times generation unit 1200. A first sensing resistor 1210 including a NTC sensor and a PTC sensor connects to the first delay generator 1201 and thermally connected to a first high side device. A second sensing resistor 1220 including a NTC sensor and a PTC sensor connects to the second delay generator 1203 and thermally connected to a first low side device. The output HI-1 of the dead times generation unit 1200 connects to a gate of the first high side device via a first driver and the output LI-1 of the dead times generation unit 1200 connects to a gate of the first low side device via the first driver. Similarly, a third sensing resistor 1230 including a NTC sensor and a PTC sensor connects to the third delay generator 1205 and thermally connected to a second high side device. A fourth sensing resistor 1240 including a NTC sensor and a PTC sensor connects to the fourth delay generator 1207 and thermally connected to a second low side device. The output HI-2 of the dead times generation unit connects to a gate of the second high side device via a second driver and the output LI-2 of the dead times generation unit connects to a gate of the second low side device via the second driver.

Figure 13:
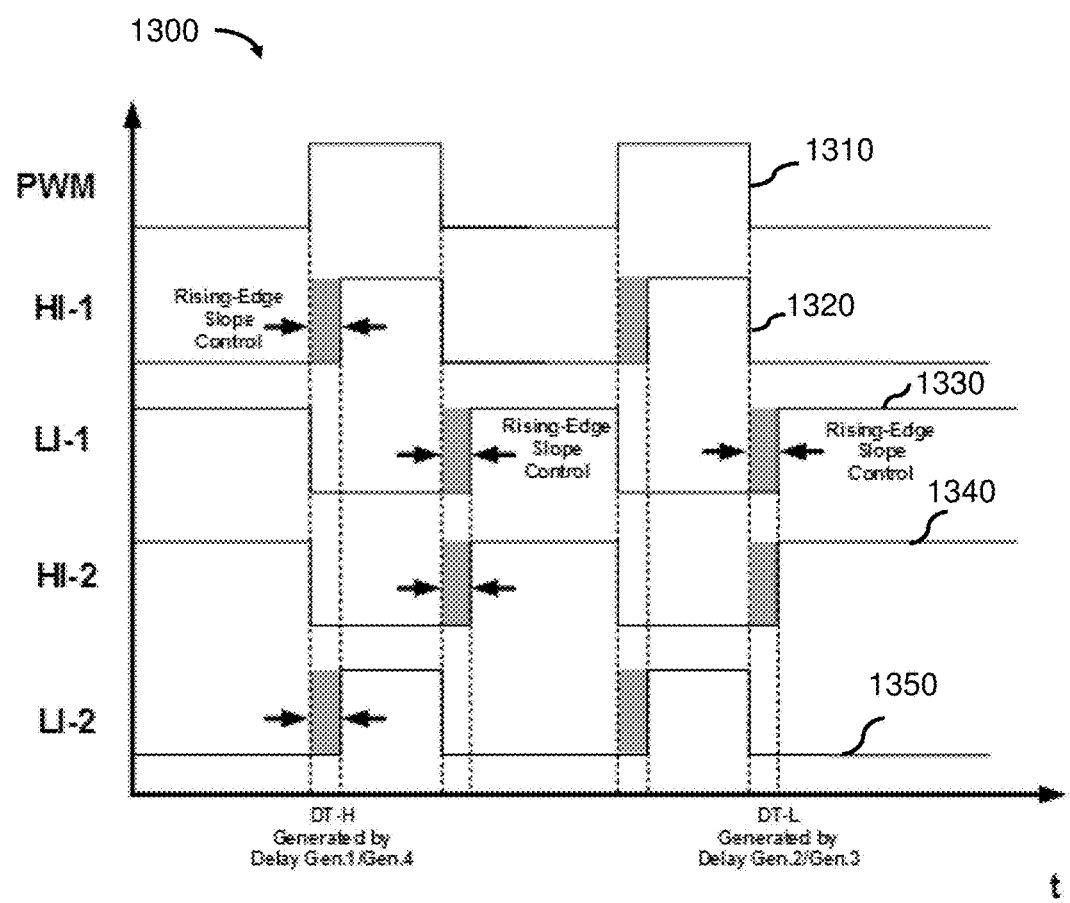
FIG. 13 shows the voltage waveforms at the pulse width modulator input node and at the outputs HI-1, LI-1, HI-2, LI-2 of the dead times generation unit in FIG. 12 in accordance with an example embodiment.

FIG. 13 shows the voltage waveform 1310 at the pulse width modulator input node 1250 in FIG. 12, the voltage waveform 1320 at the output HI-1 of the dead times generation unit 1200 in FIG. 12, the voltage waveform 1330 at the output LI-1 of the dead times generation unit 1200 in FIG. 12, the voltage waveform 1340 at the output HI-2 of the dead times generation unit 1200 in FIG. 12 and the voltage waveform 1350 at the output LI-2 of the dead times generation unit 1200 in FIG. 12 in one example embodiment. First dead time intervals DT-H are generated by the first delay generator and the fourth delay generator, and are corresponding to dead times before the first high side device and the second low side device are turned on. A second dead time intervals DT-L are generated by the second delay generator and the third delay generator, and are corresponding to dead times before the first low side device and the second high side device are turned on.

Figure 14:
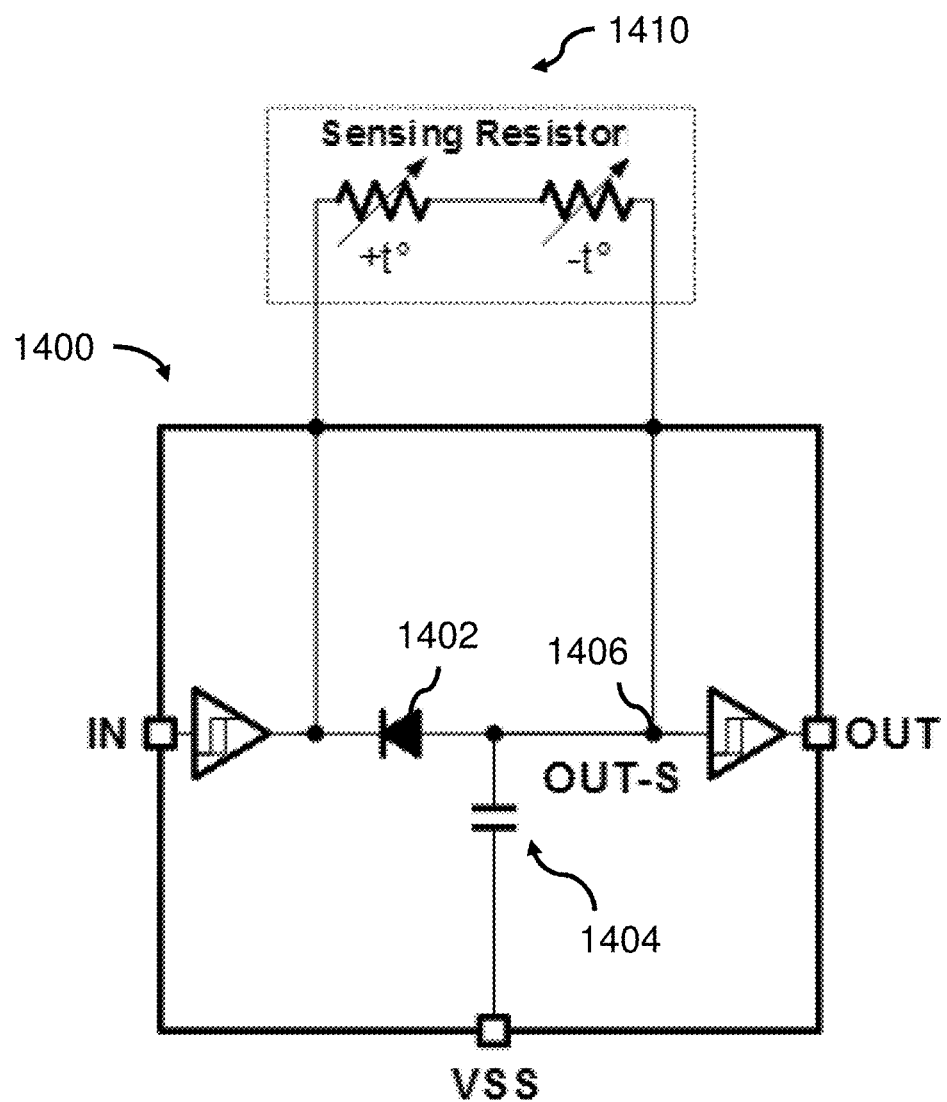
FIG. 14 shows a block diagram for a delay generator in accordance with an example embodiment.

FIG. 14 shows a block diagram for a delay generator 1400 in an example embodiment. A sensing resistor 1410 including two types of thermistors is connected between an input and an output of the delay generator 1400. The thermistors are selected from a group consisting of NTC sensor and PTC sensor. By way of example, at least one NTC sensor and at least one PTC sensor are serially connected. A capacitor 1404 is connected between the output of the delay generator 1400 and the ground to create a RC circuit. The PTC sensor performs overheat protection and the NTC sensor is used to fine tune the delay time generated from the delay generator. An output of a diode 1402 connects to the input of the delay generator. An input of the diode 1402 connects to the output of the delay generator 1400 and the capacitor 1404. The function of this diode is to eliminate the fall-edge delay by the RC circuit.

By way of example, the delay generator 1400 in FIG. 14 is used as the first delay generator 1100, the second delay generator 1200 in FIG. 10 in an example embodiment.

By way of example, the delay generator 1400 in FIG. 14 is used as the first delay generator 1201, the second delay generator 1203, the third delay generator 1205 and the fourth delay generator 1207 in FIG. 12 in an example embodiment.

Figure 15:
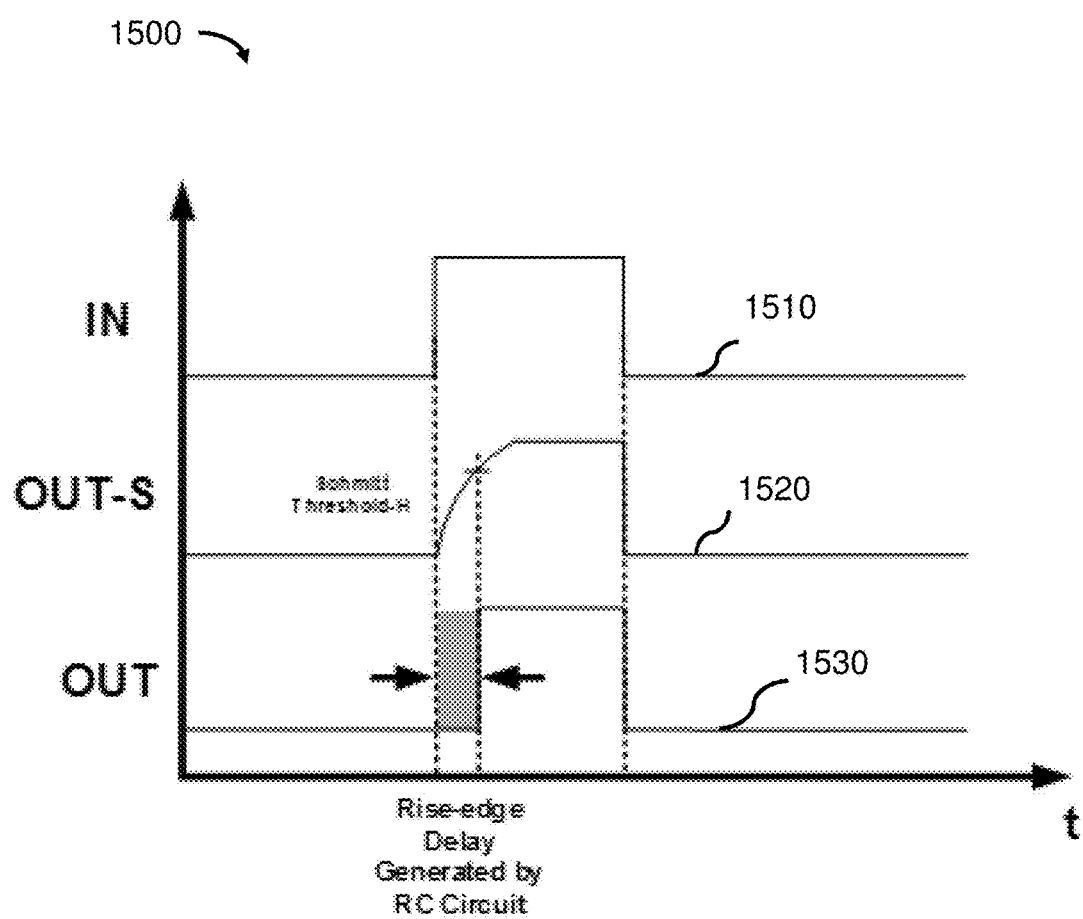
FIG. 15 shows the voltage waveforms at the input, the OUT-S node and the output of the delay generator in FIG. 14 in accordance with an example embodiment.

FIG. 15 shows the voltage waveform 1510 at the input of the delay generator 1400 in FIG. 14, the voltage waveform 1520 at the OUT-S node 1406 of the delay generator 1400 in FIG. 14 and the voltage waveform 1530 at the output of the delay generator 1400 in FIG. 14 in an example embodiment. The RC circuit in FIG. 14 creates a delay time for the rising edge of the input signal. The RC circuit creates two delays as FIG. 9, the diode in FIG. 14 eliminates the falling delay.

Figure 16:
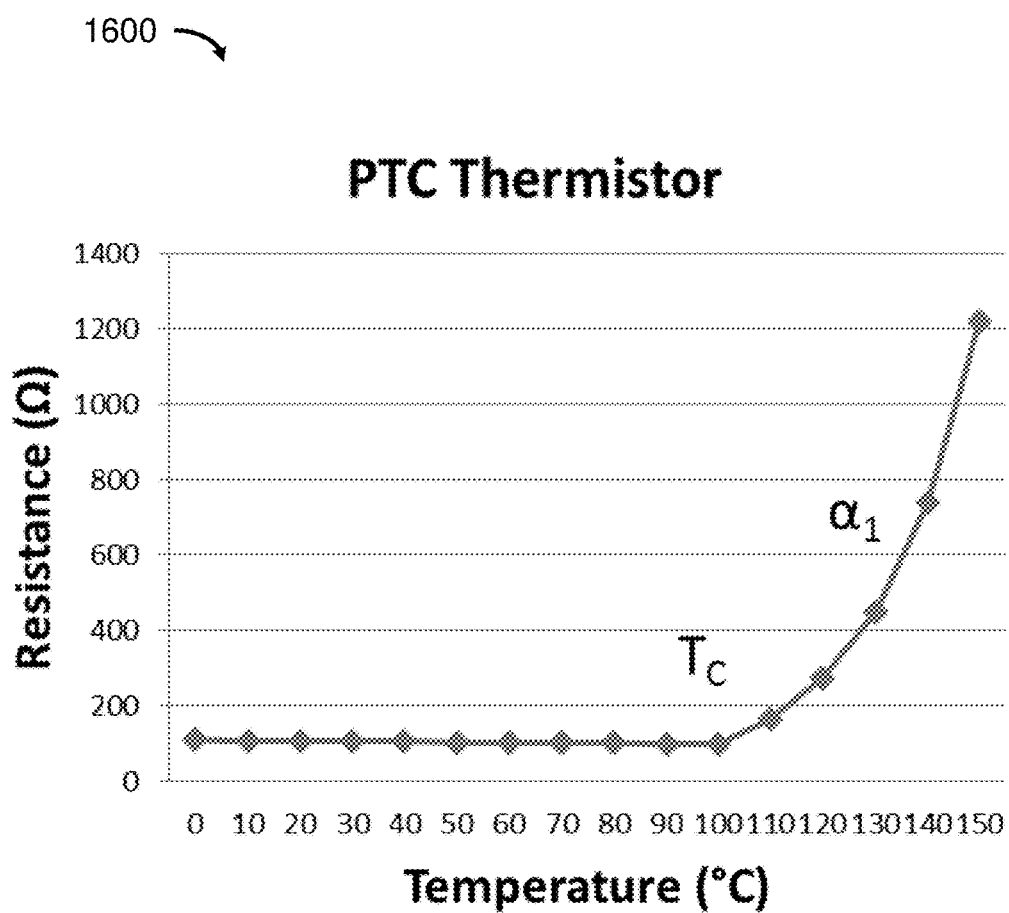
FIG. 16 shows the resistance varies with the temperature of a PTC sensor in accordance with an example embodiment.

FIG. 16 shows a graph 1600 illustrating the resistance varies with the temperature of a PTC sensor in one example embodiment. The resistance remains constant between room temperature and the Curie temperature of the PTC sensor. Once the temperature exceeds the Curie temperature, the resistance increases sharply. When the inverter circuit operates in abnormal conditions, such as the devices overheat due to serious switching loss or shoot-through, the devices are turned off due to extremely long delay times generated from the delay generators. The slope of the curve of which the temperature exceeds the Curie temperature determines the rate of over heat protection and is represented by a constant $\alpha_1$. The value of $\alpha_1$ is determined based on the practical applications. The larger $\alpha_1$ means larger resistance increase as temperature increases, which means narrow overheat margin.

Figure 17:
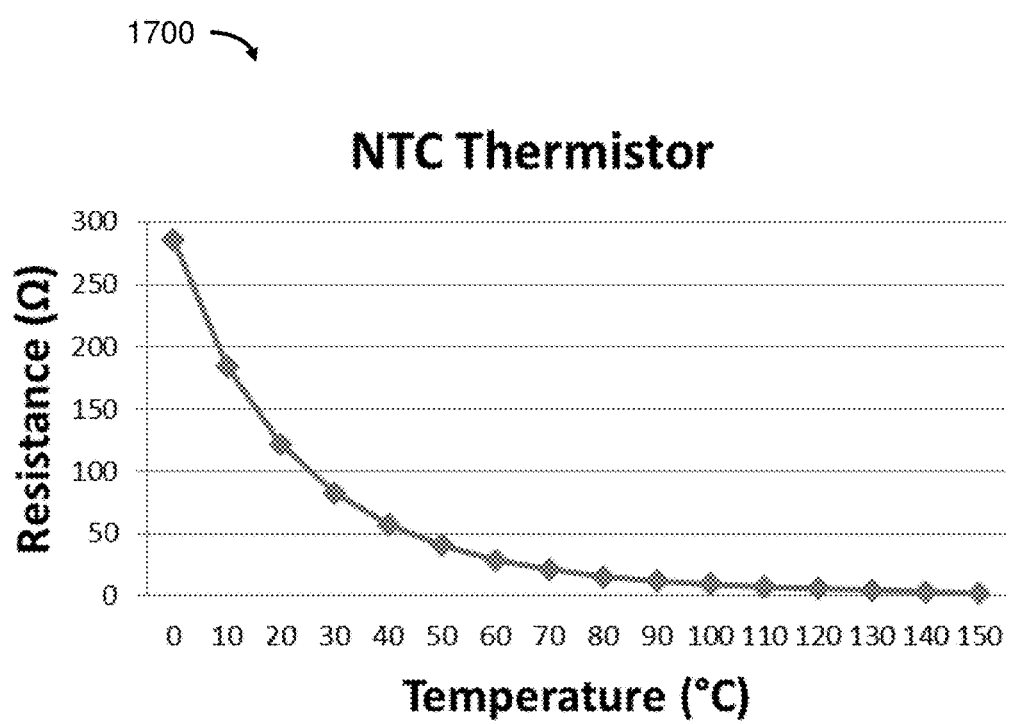
FIG. 17 shows the resistance varies with the temperature of a NTC sensor in accordance with an example embodiment.

FIG. 17 shows a graph 1700 illustrating the resistance varies with the temperature of a NTC sensor in one example embodiment. The resistance decreases smoothly as the temperature increases. Based on this characteristic, a NTC sensor with an initial value at 25° C. is utilized to sense the temperature of a device in an inverter circuit. The initial resistance determines the maximum dead time of the inverter circuit. If the dead time is excessively long, the temperature of the device increases and the resistance of the NTC sensor drops, the dead time length is narrowed. When the dead time reaches an optimal dead time value, the temperature and the resistance of the NTC sensor both keep stable.

Figure 18:
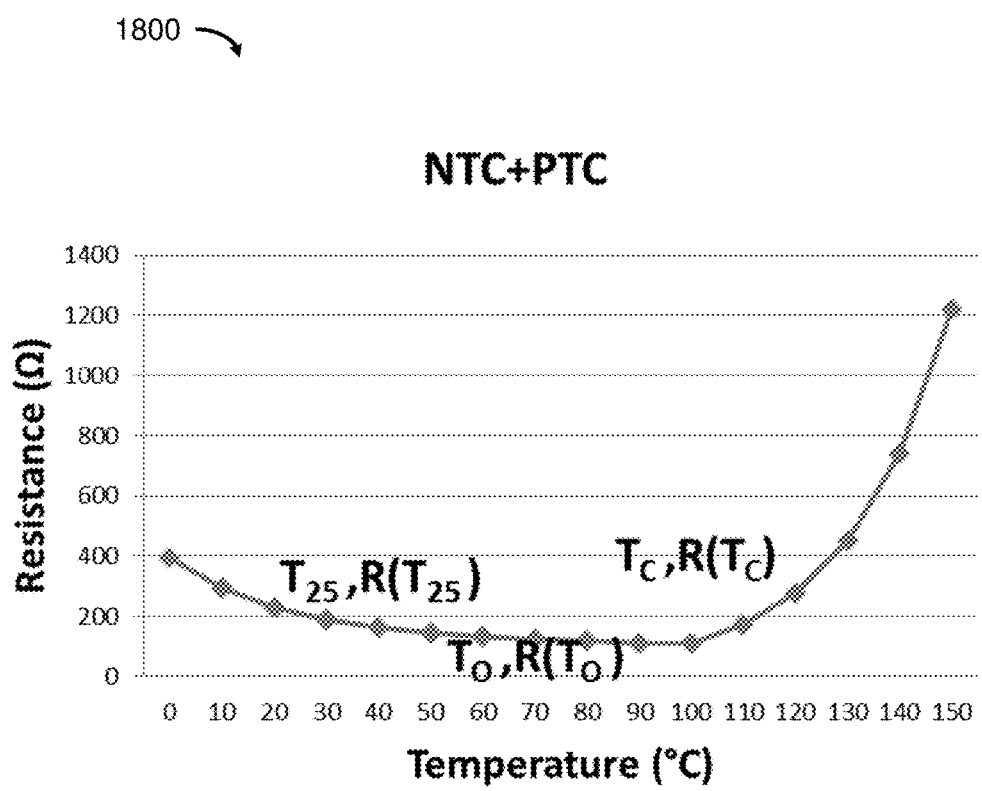
FIG. 18 shows the resistance varies with the temperature of a sensing resistor including a NTC sensor and a PTC sensor in accordance with an example embodiment.

FIG. 18 shows a graph 1800 illustrating the resistance varies with the temperature T of a sensing resistor including a NTC sensor and a PTC sensor in one example embodiment. The resistance of the sensing resistor is determined by:

$$R(T) = R_{NTC} e^{(A+B/T+C/T^2)} + R_{PTC} \text{ for } T < T_C; \text{ and}$$

$$R(T) = R_{NTC} e^{(A+B/T+C/T^2)} + R_{PTC} e^{\alpha_1(T-T_C)} \text{ for } T \geq T_C,$$

where T is the temperature of the sensing resistor, $T_C$ is the Curie temperature of the sensing resistor, $R_{NTC}$ is a resistance at rated temperature of the NTC sensor, e.g., 25° C., $R_{PTC}$ is a rated resistance of the PTC sensor below the Curie temperature, $\alpha_1$ is a constant value, A, B and C are Steinhart-Hart coefficients.

In one example embodiment, shoot-through currents in an inverter circuit are prevented by operating the inverter circuit with dead times within a maximum dead time and a minimum dead time. The maximum dead time depends on a resistance of at least one sensing resistor at a rated temperature, and the minimum dead time depends on the resistance of the at least one sensing resistor at Curie temperature.

In one example embodiment, a sensing resistor includes a NTC sensor and a PTC sensor. The parameters of the NTC sensor and the PTC sensor are calculated to achieve optimal dead time value for the devices in an inverter circuit using below steps. Firstly, a maximum dead time in an example embodiment is determined by $T_{DMAX} = kR(T_{25})*C'$, where k a constant related to a Schmitt trigger threshold voltage and a RC delay constant, C' is a fixed capacitor value of the delay generator, $R(T_{25})$ is the resistance of the sensing resistor at temperature $T_{25} = 25°$ C. and is sum of the resistance of the NTC sensor at 25° C. and the resistance of the PTC sensor at 25° C. Secondly, a minimum dead time in one example embodiment is determined by $T_{Dmin} = kR(T_C)*C'$, where k a constant related to a Schmitt trigger threshold voltage and a RC delay constant, C' is a fixed capacitor value of the delay generator, $R(T_C)$ is the resistance of the sensing resistor at Curie temperature $T_C$ and is sum of the resistance of the NTC sensor at Curie temperature and the resistance of the PTC sensor at Curie temperature. Thirdly, since temperature variation range are all known, Steinhart-Hart coefficients A, B and C are determined for a specification of the inverter circuit. The Steinhart-Hart equation is a model of the resistance of a NTC at different temperatures. The equation is given by:

$$\frac{1}{T} = A + B \ln R(T) + C(\ln R(T))^3$$

For the three temperatures: $T_{25}$, $T_{optim}$, and $T_C$, three resistor values $R(T_{25})$, $R(T_{optim})$, and $R(T_C)$ are obtained from the dead time requirement. With that, the NTC's Steinhart-Hart coefficients A, B and C are obtained using equations below:

$$\frac{1}{T_{25}} = A + B \cdot \ln(R_{T25}) + C \cdot (\ln(R_{T25}))^3$$

$$\frac{1}{T_c} = A + B \cdot \ln(R_{Tc}) + C \cdot (\ln(R_{Tc}))^3$$

$$\frac{1}{T_{optim}} = A + B \cdot \ln(R_{Toptim}) + C \cdot (\ln(R_{Toptim}))^3$$

where $T_{optim}$ is the optimal temperature and $R_{Topim}$ is the optimal resistance of the sensing resistor to achieve optimal dead time value. Thus, the desirable values of A, B and C are determined. NTC sensor and the PTC sensor with suitable parameters are chosen for the methods and apparatus in example embodiments.

When the inverter circuit operates abnormally, the devices in an inverter circuit suffers overheat problem. A maximum operation temperature Tp is set to protect the devices. Once the temperatures of the devices reaches Tp, the resistances of the sensing resistors are b times larger than the $R(T_C)$, where b is a large constant based on practical operation. Based on the resistances at temperatures $T_C$ and Tp, $\alpha_1$ for the PTC sensor can be calculated using below formula:

$$\alpha_1 = \frac{\ln\left(\frac{(b-1)R(T_C)}{R_{PTC}}\right)}{(T_O - T_C)}$$

The methods in accordance with example embodiments are provided as examples, and examples from one method should not be construed to limit examples from another method. Further, methods discussed within different figures can be added to or exchanged with methods in other figures. Further yet, specific numerical data values (such as specific quantities, numbers, categories, etc.) or other specific information should be interpreted as illustrative for discussing example embodiments. Such specific information is not provided to limit example embodiments. Example embodiments can implement different digital logic gates such as NAND gate for inserting dead times in the inverter circuit.

As used herein, a "body-diode conduction time" is a period that the current flows via the high-resistive parasitic body-diode path paralleled with the device channel when the channels of high side and low side devices in the power inverters are both off, e.g. dead time intervals.

As used herein, a "Curie temperature" is a threshold temperature at which the material (PTC) changes its characteristics, e.g. resistance sharp increase. The characteristic of Curie temperature is utilized to limit the maximum current of power devices, hence prevent shoot through current.

As used herein, a "dead time generator" is a circuit that inserts dead times into a PWM signal so, for example, conduction in two or more power transistors in a half-bridge or a full-bridge does not overlap.

As used herein, "device", "high side device", "low side device" are power transistors in an inverter circuit.

As used herein, an "inverter circuit" is an electronic circuitry that changes direct current (DC) to alternating current (AC).

As used herein, "shoot-through current" is a rush of current that occurs while both devices in an inverter circuit are on, and "shoot-through" refer to a current flow from Vamp to the ground through both devices in an inverter circuit.

As used herein, a "thermistor" is a type of resistor whose resistance is dependent on temperature.

What is claimed is:

1. A method that prevents shoot-through currents and reduces body-diode conduction time in an inverter circuit, the method comprising:
sensing, with a first sensing resistor, temperatures of a high side device in the inverter circuit;
sensing, with a second sensing resistor, temperatures of a low side device in the inverter circuit;
changing, by a first delay generator and in response to receiving the temperatures from the first sensing resistor, first dead time intervals that correspond to dead times before the high side device is turned on;
changing, by a second delay generator and in response to receiving the temperatures from the second sensing resistor, second dead time intervals that correspond to dead times before the low side device is turned on; and
preventing the shoot-through currents and reducing body-diode conduction time in the inverter circuit by generating dead times based on the first dead time intervals and the second dead time intervals.

2. The method of claim 1 further comprising:
changing resistances of the first sensing resistor in response to sensing the temperatures of the high side device; and
changing resistances of the second sensing resistor in response to sensing the temperatures of the low side device.

3. The method of claim 1 further comprising:
changing first delay times generated from the first delay generator in response to changes in the resistances of the first sensing resistor; and
changing second delay times generated from the second delay generator in response to changes in the resistances of the second sensing resistors,
wherein the first sensing resistor is connected between an input and an output of the first delay generator, a first capacitor is connected between the output of the first delay generator and a ground; the second sensing resistor is connected between an input and an output of the second delay generator and a second capacitor is connected between the output of the second delay generator and the ground.

4. The method of claim 1 further comprising:
inserting a NOR gate in the inverter circuit, wherein an input of the first delay generator connects to a first input of a NOR gate and a pulse width modulator input node, an output of the first delay generator connects to an input of the second delay generator and the high side device, an output of the second delay generator connects to a second input of the NOR gate, and an output of the NOR gate connects to the low side device.

5. The method of claim 1, wherein the first sensing resistor includes a first negative temperature coefficient (NTC) sensor and a first positive temperature coefficient (PTC) sensor that are serially connected, the second sensing resistor includes a second NTC sensor and a second PTC sensor that are serially connected.

6. The method of claim 1, wherein the high side device and low side device are selected from a group consisting of enhancement mode GaN, GaN power transistors and silicon MOSFET.

7. An inverter circuit that prevents shoot-through currents and reduces body-diode conduction time in the invertor circuit, comprising:
a first sensing resistor that is thermally connected to a high side device in the inverter circuit;
a second sensing resistor that is thermally connected to a low side device in the inverter circuit;
a dead times generation unit that prevents shoot-through currents and reduces body-diode conduction time by generating dead times including first dead time intervals and second dead time intervals for the high side device and the low side device and includes:
a first delay generator that changes the first dead time intervals, wherein the first sensing resistor is connected between an input and an output of the first delay generator, a first capacitor is connected between the output of the first delay generator and a ground; and
a second delay generator that changes the second dead time intervals that, wherein the second sensing resistor is connected between an input and an output of the second delay generator, a second capacitor is connected between the output of the second delay generator and the ground.

8. The inverter circuit of claim 7 further comprising:
a NOR gate, wherein the input of the first delay generator connects to a first input of the NOR gate and a pulse width modulator input node, the output of the first delay generator connects to the input of the second delay generator and the high side device, the output of the second delay generator connects to a second input of the NOR gate, an output of the NOR gate connects to the low side device.

9. The inverter circuit of claim 7 further comprising:
a NOT gate, wherein the input of the first delay generator connects to a pulse width modulator input node, the output of the first delay generator connects to the high side device, an input of the NOT gate connects to the pulse width modulator input node, the input of the second delay generator connects to an output of the NOT gate, the output of the second delay generator connects to the low side device.

10. The inverter circuit of claim 7, wherein the input of the first delay generator connects to an output of a first diode and an input of the first diode connects to the output of the first delay generator and the first capacitor, the input of the second delay generator connects to an output of a second diode and an input of the second diode connects to the output of the second delay generator and the second capacitor.

11. The inverter circuit of claim 7, wherein the first sensing resistor includes a first negative temperature coefficient (NTC) sensor and a first positive temperature coefficient (PTC) sensor that are serially connected and the second sensing resistor includes a second NTC sensor and a second PTC that are serially connected.

12. The inverter circuit of claim 7, wherein the inverter circuit is a Class-D half bridge circuit.

13. The inverter circuit of claim 7, wherein the inverter circuit is a Class-D full bridge circuit.

14. The inverter circuit of claim 7, wherein the high side device and the low side device are selected from a group consisting of enhancement mode GaN, GaN power transistors and silicon MOSFET.

15. A method that prevents shoot-through currents and reduces body-diode conduction time in an inverter circuit, the method comprising:
sensing temperatures of at least one high side device in the inverter circuit and temperatures of at least one low side device in the inverter circuit;

changing, with at least one delay generator and in response to receiving the temperatures of the at least one high side device and the temperatures of the at least one low side device, first dead time intervals that correspond to dead times before the at least one high side device is turned on and second dead time intervals that correspond to dead times before the at least one low side device is turned on; and preventing shoot-through currents and reducing body-diode conduction time by operating the inverter circuit with dead times within a maximum dead time and a minimum dead time, wherein the maximum dead time depends on a resistance of at least one sensing resistor at a rated temperature and the minimum dead time depends on the resistance of the at least one sensing resistor at Curie temperature.

16. The method of claim 15 further comprising:

changing resistances of a first sensing resistor in response to sensing the temperatures of the at least one high side device;

changing resistances of a second sensing resistor in response to sensing the temperatures of the at least one low side device;

generating first delay times generated from a first delay generator in response to changes in the resistances of the first sensing resistor; and generating second delay times generated from a second delay generator in response to changes in the resistances of the second sensing resistors, wherein the first sensing resistor is connected between an input and an output of the first delay generator, a first capacitor is connected between the output of the first delay generator and a ground; the second sensing resistor is connected between an input and an output of the second delay generator and a second capacitor is connected between the output of the second delay generator and the ground.

17. The method of claim 15 further comprising:

inserting a NOR gate in the inverter circuit, wherein an input of a first delay generator connects to a first input of a NOR gate and a pulse width modulator input node, an output of the first delay generator connects to an input of a second delay generator and the at least one high side device, an output of the second delay generator connects to a second input of the NOR gate, and an output of the NOR gate connects to the at least one low side device.

18. The method of claim 15, wherein the at least one sensing resistor includes a negative temperature coefficient (NTC) sensor and a positive temperature coefficient (PTC) sensor that are serially connected.

19. The method of claim 15 further comprising determining dead times $T_D$ by $T_D = kR(T)*C'$, wherein k a constant related to a Schmitt trigger threshold voltage and a RC delay constant, C' is a fixed capacitor value, the resistance R(T) of the at least one sensing resistor including a negative temperature coefficient (NTC) sensor and a positive temperature coefficient (PTC) sensor is determined by:

$$R(T)=R_{NTC}e^{(A+B/T+C/T^2)}+R_{PTC} \text{ for } T<T_C; \text{ and}$$

$$R(T)=R_{NTC}e^{(A+B/T+C/T^2)}+R_{PTC}e^{\alpha_1(T-T_C)} \text{ for } T \geq T_C,$$

T is the temperature of the at least one sensing resistor, $T_C$ is a Curie temperature, $R_{NTC}$ is a resistance at rated temperature of the NTC sensor, $R_{PTC}$ is a rated resistance of the PTC sensor below the Curie temperature, $\alpha_1$ is a constant value, A, B and C are Steinhart-Hart coefficients.

20. The method of claim 15, wherein the at least one high side device and the at least one low side device are selected from a group consisting of enhancement mode GaN, GaN power transistors and silicon MOSFET.

* * * * *